United States Patent

[11] 3,591,703

[72] Inventors George F. Swenck;
John J. Bahen, Jr.; Robert B. Lightner, all of Richmond, Va.
[21] Appl. No. 864,438
[22] Filed Oct. 7, 1969
[45] Patented July 6, 1971
[73] Assignee Reynolds Metals Company
Richmond, Va.

[54] ELECTRICAL EXPANSION JOINT AND SYSTEM USING SAME
20 Claims, 7 Drawing Figs.

[52] U.S. Cl. .................................................... 174/13,
174/15 C, 174/21 C, 174/28, 174/99 E
[51] Int. Cl. .................................................... H01b 9/04,
H02g 15/24
[50] Field of Search ............................................ 174/12 R,
13, 15 C, 16 B, 21 R, 21 C, 21 CA, 22 R, 22 C, 27, 28, 29, 86, 88 R, 88 B, 88 C, 99 R, 99 B, 99 E; 339/1 R, 8 R, 9 E; 285/223, 298

[56] References Cited
UNITED STATES PATENTS
| 409,183 | 8/1889 | De Ferranti | 174/86 |
| 2,306,527 | 12/1942 | Daniels | 174/12 UX |
| 3,325,588 | 6/1967 | Lear | 174/99 (B) X |

Primary Examiner—Laramie E. Askin
Attorney—Glenn, Palmer, Lyne, Gibbs & Thompson ABSTRACT: An expansion joint having a pair of spaced supports which are adapted to be fixed to associated ends of a pair of electrical conductors and the expansion joint is provided with a plurality of flexible electrical leads having their opposite ends fastened to the spaced supports. Means is provided for rotating the central portions of the leads to take up varying amounts of slack therein caused by relative movement of the supports toward and away from each other.

PATENTED JUL 6 1971 3,591,703

INVENTORS
GEORGE F. SWENCK
JOHN J. BAHEN, JR.
BY ROBERT B. LIGHTNER

Glenn, Palmer & Lyne,
Gibbs & Thompson
THEIR ATTORNEYS

PATENTED JUL 6 1971
3,591,703
SHEET 2 OF 2
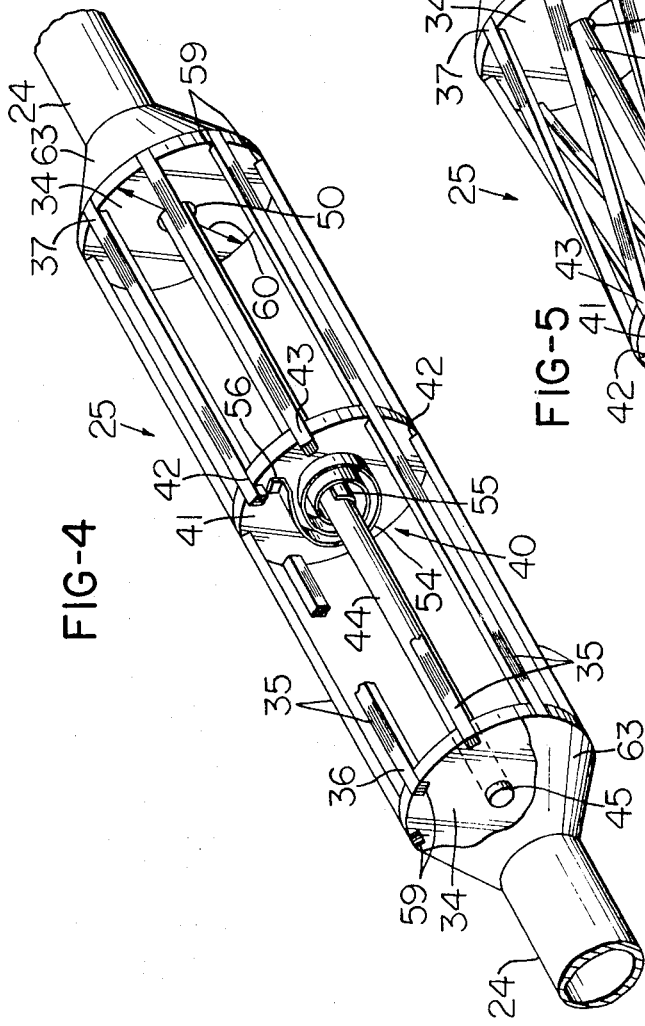
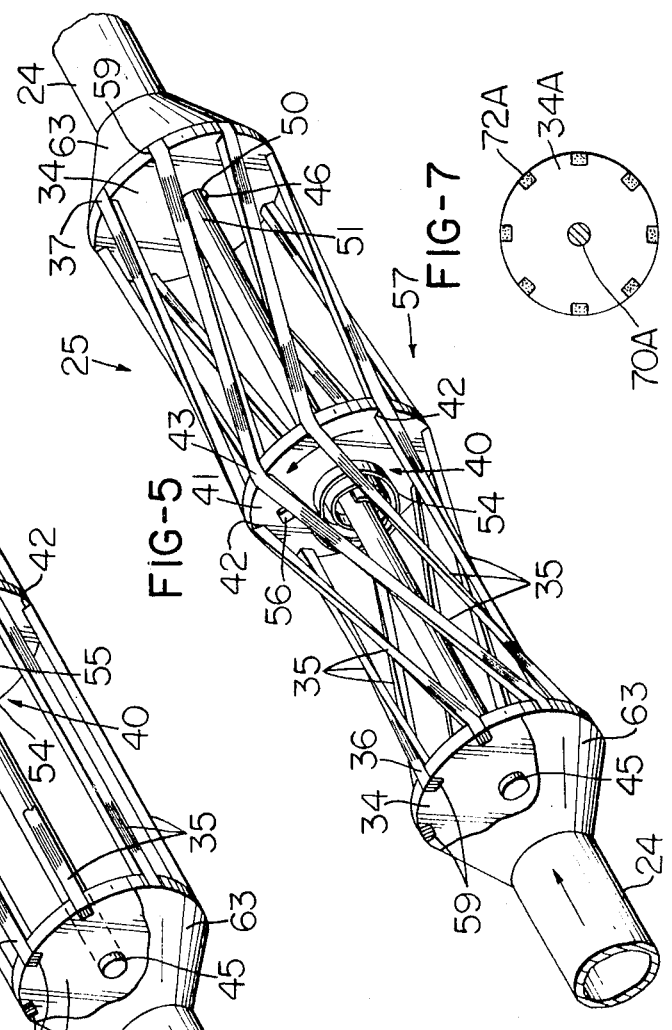
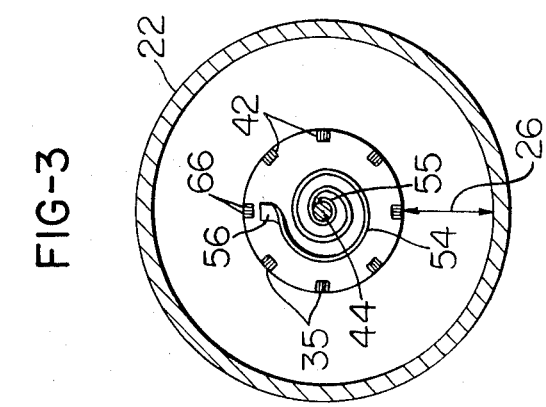
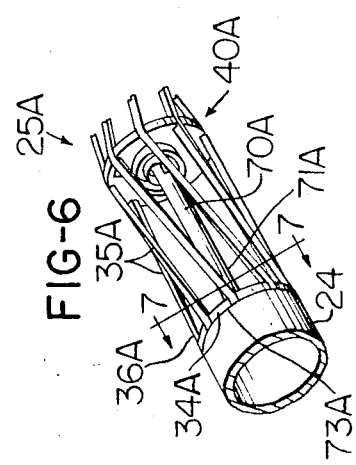
INVENTORS
GEORGE F. SWENCK
JOHN J. BAHEN, JR.
BY ROBERT B. LIGHTNER
Glenn, Palmer, Lyne,
Gibbs & Thompson
THEIR ATTORNEYS

ELECTRICAL EXPANSION JOINT AND SYSTEM USING SAME

BACKGROUND OF THE INVENTION

Electrical power transmission conductors used to transmit electrical power over great distances are subject to a wide range of temperatures causing large expanding and contracting movements thereof. In underground systems, for example, the conductors must be supported laterally in an electrically insulated manner within confined limits and such conductors expand and contract comparatively large amounts along their length. In particular, the typical change in length in a 40-foot length of a 230 kv. transmission system due to current flow may be generally of the order of one-half inch and is produced by a temperature change of approximately 80° C. and under overload conditions greater temperature changes result in length changes approaching 1 inch in each 40-foot length. Therefore, it is necessary to provide means for compensating for the large amounts of expansion and contraction by either system design or providing suitable expansion joints, or the like. In using one or more expansion joints in a system wherein the conductors are housed in a protective conduit it is desirable that each expansion joint be of minimum size so that it may be housed within such conduit with maximum space between the expansion joint and protective conduit; and, it is also desirable that the expansion joint be constructed so that it does not increase in diameter or cross-sectional outline during expanding and contracting movements thereof.

SUMMARY

This invention provides an improved expansion joint and electrical power transmission system using same wherein such expansion joint is of substantially cylindrical configuration and has a cross-sectional peripheral outline which remains substantially constant with expanding and contracting movements thereof, making it readily useable in a transmission system which uses conductors which are housed in a protective conduit. The expansion joint has a pair of spaced supports each adapted to be fixed to an end of an associated electrical conductor and is provided with a plurality of flexible electrical leads having their opposite ends fastened to the spaced supports with means being provided to rotate a central portion of the leads to take up varying amounts of slack therein caused by relative movement of the supports toward and away from each other.

Other details, uses, and advantages of this invention will become apparent as the following description of the exemplary embodiments thereof presented in the accompanying drawings proceeds.

BRIEF DESCRIPTION OF THE DRAWINGS

The accompanying drawings show present exemplary embodiments of this invention, in which

FIG. 3 is a view taken essentially on the line 3-3 of FIG. 2;

FIG. 4 is a perspective view with parts broken away of the exemplary expansion joint illustrated in FIG. 1 fastened between an associated pair of electrical conductors and showing a plurality of flexible electrical leads comprising the expansion joint in a straight condition;

FIG. 5 is a perspective view similar to FIG. 4 and particularly illustrating opposed end supports of the expansion joint of FIG. 1 moved toward each other due to expansion of an associated pair of electrical conductors toward each other and illustrating the manner in which rotating means comprising the expansion joint take up slack in the electrical leads due to such expansion;

FIG. 6 is a fragmentary, perspective view similar to the left-hand portion of the view illustrated in FIG. 5 and illustrating another exemplary embodiment of the expansion joint of this invention; and FIG. 7 is a cross-sectional view taken essentially on the line 7-7 of FIG. 6.

DESCRIPTION OF ILLUSTRATED EMBODIMENTS

Figure 1:
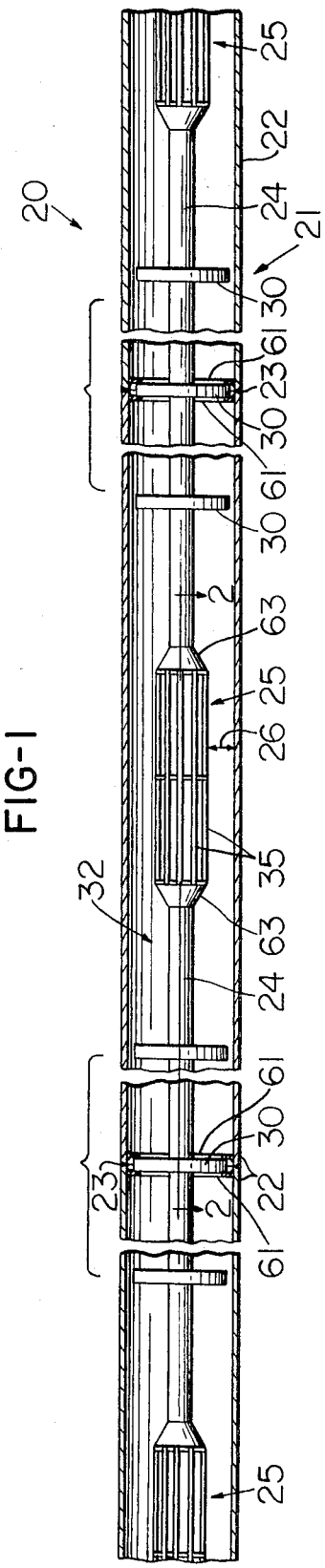
FIG. 1 is a view with parts in cross section and parts broken away illustrating a plurality of expansion joints of this invention suitably fastened in position to associated ends of elongated electrical conductors, with the conductors and expansion joints being carried within an associated protective conduit to define a portion of a housed electrical power transmission system.

Reference is now made to FIG. 1 of the drawings wherein one exemplary embodiment of an electrical power transmission system of this invention is illustrated and designated generally by the reference numeral 20. The power transmission system may be used in any application where it is desired to transmit electrical power through housed or protected conductors and comprises an outer protective conduit or housing which is designated generally by the reference numeral 21 and is comprised of a plurality of substantially cylindrical conduit sections 22 suitably fixed together in end-to-end relation so as to provide a fluidtight connection between adjoining sections. In this example of the invention adjoining conduit sections 22 are fixed together by welding at a plurality of locations each designated by the reference numeral 23.

The exemplary electrical system 20 comprises a plurality of elongated tubular electrical conductors 24 which in this example of the invention have a right circular cylindrical outer configuration. However, it will be appreciated that the conductors 24 used in system 20 may have any desired peripheral outline as viewed in cross section and may be of solid rather than of tubular construction and selected ones of the conductors 24 are suitably fixed together in end-to-end relation utilizing one exemplary embodiment of the expansion joint of this invention which is designated generally by the reference numeral 25.

The expansion joint 25 may be installed in position at any desired location along the length of the electrical power transmission system 20 and is utilized to compensate for expanding and contracting movements of associated electrical conductors 24. The expansion joint 25 is of comparatively small peripheral outline as viewed in cross section, see FIGS. 1—3, which enables it to be used in the electrical power transmission system 20 without providing enlarged portions in the housing 21 and the unique construction of the expansion joint 25 is such that during expanding and contracting movements thereof its peripheral outline as viewed in cross section remains substantially constant and once the expansion joint 25 has been installed in position it is not necessary to be concerned with a change in size thereof and particularly with an increase in peripheral outline due to expansion of an associated pair of conductors 24 between which such expansion joint is installed, whereby the expansion joint 25 assures that a safe distance indicated at 26 is maintained between the entire outer periphery of such expansion joint and the inside surface of the housing 21 upon suitably supporting the conductors 24 and expansion joints 25 within the protective housing 21.

Figure 2:
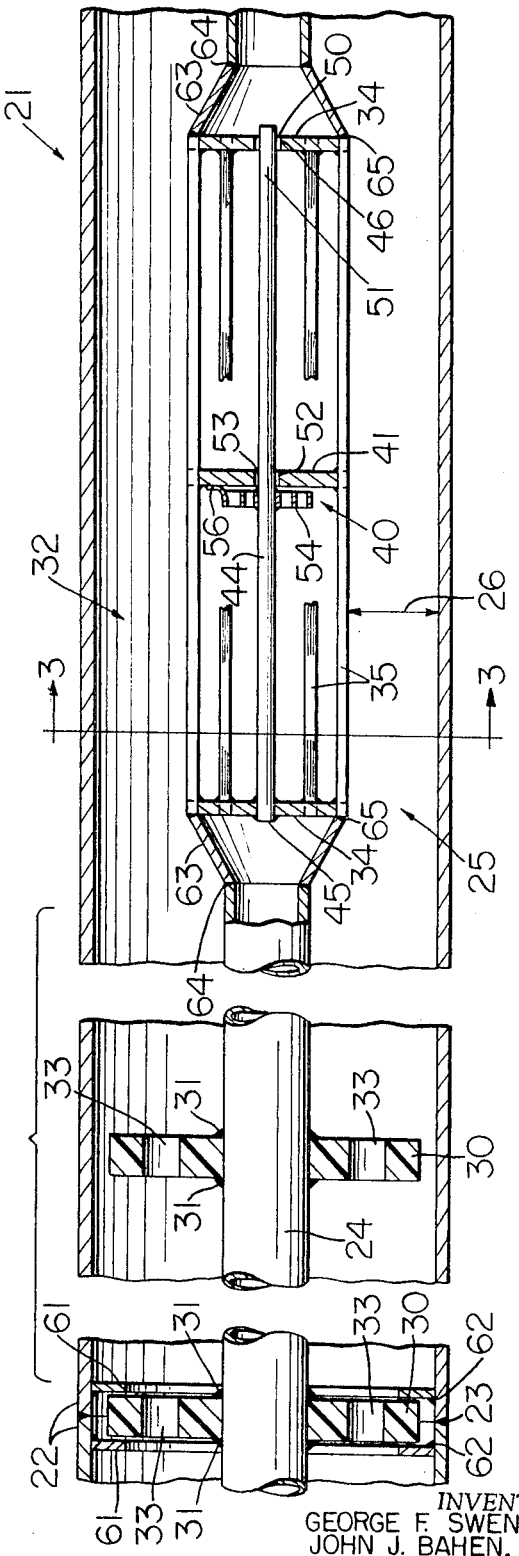
FIG. 2 is a greatly enlarged view taken essentially on the line 2-2 of FIG. 1 with parts in cross section and parts broken away.

The conductors 24 are supported substantially centrally within protective conduit 21 by a plurality of insulating spacers 30 and each spacer 30 is made of a suitable electrical insulating material. Each spacer 30 is attached to its associated electrical conductor 24 using any suitable technique such as welding, adhesive means, or spotwelding annular bands or lugs in position against an associated portion of the tubular conductor 24 so as to prevent axial movement of spacer 30 relative to its associated conductor. As seen in FIG. 2 of the drawings, each spacer 30 of this example is shown held in its axial position by annular beads 31 welded against the associated conductor 24 on opposite sides thereof.

The power transmission system 20 preferably utilizes an electrically nonconductive (i.e., electrical insulating) fluid such as an inert gas, for example, under pressure which is carried within the protective conduit 21 so that it fills the volume between each conductor 24 and expansion joint 25 and the outer housing 21. The use of an inert gas, indicated by the reference numeral 32 in FIGS. 1 and 2, under pressure, helps to assure the provision of optimum electrical insulation along the full length of each electrical conductor 24 and expansion joint 25 and such inert gas also serves to dissipate heat away from the conductors 24 and expansion joints 25 to help provide more efficient cooling of these components. Further, each insulating spacer 30 has a plurality of openings 33 provided therein in any desired pattern to enable unobstructed flow of the inert gas along the full length of the protective conduit 21.

As seen particularly in FIGS. 4 and 5 of the drawings, each expansion joint 25 comprises a pair of spaced supports or end plates 34 of circular peripheral outline and each plate 34 is adapted to be fixed to an associated one of the electrical conductors 24 and in a manner to be subsequently described. The expansion joint 25 has a plurality of flexible electrical leads 35 which have their opposite ends 36 and 37 fastened to the spaced support plates 34.

The expansion joint 25 has means for rotating a central portion of the leads 35 to take up varying amounts of slack therein caused by relative movement of the plates 34 and such rotating means is indicated generally by the reference numeral 40. The rotating means 40 comprises a rotatable central member or circular disc 41 which has a plurality of peripheral cutouts 42 provided therein and each cutout has a cross-sectional outline which corresponds to the cross-sectional outline of an associated lead 35. A central portion 43 of each lead 35 is placed within an associated cutout 42 and attached to the disc 41 as by welding or other suitable means.

The rotating means 40 also comprises an elongated member in the form of a rod 44 which in this example is of right circular cylindrical configuration and the rod 44 has one end 45 suitably fixed to one of the end plates 34. The oppositely arranged end plate 34 has a right circular cylindrical surface 46 which defines an opening 50 extending therethrough and the opposite end 51 of the rod 44 extends through the opening 50 and is supported by the cylindrical surface 46. The diameter of cylindrical surface 46 is such that the end portion 51 of rod 44 slides through opening 50 in an unobstructed manner with movement of end plates 34 toward and away from each other yet surface 46 supports end portion 51 of rod 44 in a direction perpendicular to its longitudinal axis. The circular disc 41 also has a right circular cylindrical surface 52 which defines a central opening 53, see FIG. 2, extending centrally therethrough and the rod 44 extends through opening 53 so that surface 52 rotatably supports the disc 41 on rod 44.

The rotating means 40 also comprises a spring device in the form of a torsion spring 54 which has one end 55 suitably fixed to the rod 44 and its opposite end 56 is suitably fixed to the disc 41 adjacent the outer periphery thereof whereby the torsion spring 54 constantly tends to rotate the disc 41 about the rod 44. As the associated ends of the conductors 24 move toward each other due to expansion it will be appreciated that a substantial amount of slack will be provided in the electrical leads 35 comprising the expansion joint 25. The torsion spring 54 being in a constantly coiled condition tends to rotate the circular disc 41 counterclockwise, as viewed from left to right in FIG. 5, to thereby take up the slack caused by movement of the end plates 34 toward each other and essentially as indicated at 57.

The electrical leads 35 have their opposite ends each fixed to an associated plate 34 on a given diameter and with each end of a lead 35 being received within an associated peripheral slot 59 in an associated plate 34. In this example of the invention the plates 34 are of equal diameter, indicated at 60, and the associated ends (36 or 37) of leads 35 are fixed in position with their outer surface portions substantially coinciding with the outside diameter of an associated end plate 34. The central disc 41 of this example also has the same outside diameter as the plates 34 and it will be seen that during expansion of the tubular conductors 24, from the position of FIG. 4 to the position of FIG. 5, for example, the end plates 34 move toward each other, which would ordinarily cause slack to be provided in the leads 35. However, torsion spring 54 rotates the disc 41 about rod 44 to maintain the leads 35 within the confines of a theoretical cylindrical boundary extending between the support plates 34 and such boundary could be visualized as having a diameter substantially equal to the diameter 60.

The expansion joint 25 is illustrated in FIG. 4 with the electrical leads in a straight condition, for simplicity. However, it will be appreciated that in an actual installation such expansion joint would be initially installed in position between a pair of associated electrical conductors 24 so that there would be a slight amount of slack in the conductors 35 whereby the disc 41 would be in a slightly rotated position somewhere between the position indicated in FIG. 4 and the position illustrated in FIG. 5. By installing the expansion joint in such a slightly rotated position it will be appreciated that both expanding and contracting movements could be compensated for so that in the event of contraction of the conductors 24 due to environmental conditions the tendency would be for movement of the plates 34 away from each other whereby the electrical leads 35 would then tend to straighten toward the position illustrated in FIG. 4.

Certain ones of the conductors 24 are preferably confined to prevent axial movement thereof within the protective housing 21 and thus prevent creeping of the conductors 24 and expansion joints 25 within housing 21. In this example of the invention, certain selected ones of the spacers 30 are confined by a pair of annular rings 61, see FIGS. 1 and 2, which are arranged on opposite sides of the associated spacer 30 and each ring is welded to an associated section 22 of the outer housing 21 by an associated weld 62.

The expansion joint 25 may be suitably fixed between the ends of an associated pair of electrical conductors 24 in any suitable manner; however, in this example of the invention a substantially frustoconical tubular transition section 63 is utilized, as seen in FIG. 2, with the small-diameter end thereof welded to an associated tubular conduit 24 by a weld 64 and the large-diameter end thereof welded to an associated end plate 34 by a weld 65.

Each lead 35 comprising the expansion joint 25 may be comprised of a plurality of individual strands shown as elongated thin metal strips 66 of rectangular cross-sectional outline, see FIG. 3, having a width which is substantially greater than the thickness thereof. Each strip 66 is arranged substantially on edge with its wide surfaces arranged substantially parallel to parallel lines radiating from a central axis through the expansion joint 25 whereby the strips 66 offer minimum resistance to rotation by the rotating means 40.

Another exemplary embodiment of this invention is illustrated in fragmentary perspective view in FIG. 6 of the drawings. The expansion joint illustrated in FIG. 6 is very similar to the expansion joint 25; therefore, such expansion joint will be designated generally by the reference numeral 25A and parts of the expansion joint 25A which are very similar to corresponding parts of the expansion joint 25 will be designated by the same reference numeral as the expansion joint 25 also followed by the letter designation A and not described again. Only those component parts of the expansion joint 25A which are substantially different from corresponding parts of the expansion joint 25 will be designated by a new reference numeral also followed by the letter designation "A" and described in detail.

The main difference between the expansion joint 25 and 25A is that in the expansion joint 25A the end plates 34A are approximately equal in outside diameter to the outside diameter of the tubular electrical conductors 24 and the rotating means 40A has an elongated rod 70A which has an end 71A fixed to one end plate 34A in a substantially cantilevered manner with the length of the rod 70A being such that it extends only a short distance beyond the center of the expansion joint 25A. In addition, each lead 35A comprising the expansion joint 25A is comprised of a plurality of individual wires or strands 72A, see FIG. 7, each of circular cross-sectional outline which are suitably arranged in a bundle to define the lead 35A and if desired the wires may be twisted together. The opposite ends 36A and 37A of the leads 35A are suitably fixed to their associated end plates 34A, as by welding, to provide a high-quality mechanical and electrical connection.

Each circular end plate 34A may be welded directly to an adjoining conductor 24 by an annular weld as indicated at 73A. However, a suitable transition member such as a tubular member or solid flat disc may be interposed and welded between the end of a conductor 24 and an associated end plate 34A.

In this disclosure of the invention the electrical leads 35 comprising the expansion joint 25 are shown as being comprised of a plurality of flat strips 66 and the rod 44 of such expansion joint extends the full length thereof between associated end plates 34. However, it will be appreciated that each lead 35 may be comprised of a plurality of individual strands of either noncircular or circular cross-sectional configuration and the rod 44 need not necessarily extend the full length of the expansion joint 25 but may extend roughly one-half the length thereof in a similar manner as the rod 70A illustrated in the expansion joint 25A. Likewise, the expansion joint 25A may have its rod 70A extending the full length thereof and the individual strands or wires 72A comprising each lead 35A may be of any desired cross-sectional configuration.

Irrespective of the particular cross-sectional configuration and arrangement of its leads, the expansion joint of this invention enables expanding and contracting movements of adjoining electrical conductors while the outside diameter of such expansion joint remains substantially constant thereby assuring trouble-free operation. In addition, it will be seen that optimum controlled spacing is maintained between the electrical leads of each expansion joint irrespective of the amount of relative movement between the associated end plates whereby there is practically no chance of arcing between adjacent electrical leads. It will also be appreciated that the construction of the expansion joint of this invention is such that it may be easily provided with a suitable anticorona electrical discharge shield, if desired.

Electrical conducting materials of all types may be utilized to make the conductors 24 and expansion joints 25 comprising the system 20. Metallic materials containing aluminum are preferred in many applications and in a typical 230 kv. electrical transmission system the conductors 24 may be in the form of tubular conductors made of 6101-T64 aluminum alloy and having a 4-inch outside diameter and a ½-inch wall thickness.

While present exemplary embodiments of this invention, and methods of practicing the same, have been illustrated and described, it will be recognized that this invention may be otherwise variously embodied and practiced by those skilled in the art.

What we claim is:

1. An expansion joint for electrically connecting associated ends of a pair of electrical conductors comprising, a pair of spaced supports each adapted to be fixed to an associated one of said electrical conductors, a plurality of flexible electrical leads having their opposite ends fastened to said spaced supports, and means engaging and rotating a central portion of each lead relative to both of its opposite ends to take up any slack therein caused by relative axial movement of said supports.

2. An expansion joint for electrically connecting associated ends of a pair of electrical conductors comprising, a pair of spaced supports each adapted to be fixed to an associated one of said electrical conductors, a plurality of flexible electrical leads having their opposite ends fastened to said spaced supports, and means rotating a central portion of said leads to take up any slack therein caused by relative movement of said supports, said rotating means comprising a central member having a central portion of each lead attached thereto and a spring device acting between at least one support and said central member, said spring device yieldingly rotating said central member to thereby rotate the central portion of each lead to take up any slack therein.

3. An expansion joint as set forth in claim 2 in which said spring device comprises a torsion spring.

4. An expansion joint for electrically connecting associated ends of a pair of electrical conductors comprising, a pair of spaced supports each adapted to be fixed to an associated one of said electrical conductors, a plurality of flexible electrical leads having their opposite ends fastened to said spaced supports, and means rotating a central portion of said leads to take up any slack therein caused by relative movement of said supports, said rotating means comprising an elongated member having an end portion fixed to one of said supports, a central member supported for unobstructed rotation about said elongated member, said central member having a central portion of each lead attached thereto and a spring device acting between said elongated member and central member to yieldingly rotate said central member about said elongated member and thereby rotate the central portion of each lead to take up any slack therein.

5. An expansion joint as set forth in claim 4 in which each of said electrical leads is comprised of a plurality of individual strands arranged in a bundle.

6. An expansion joint for electrically connecting associated ends of a pair of electrical conductors comprising, a pair of spaced supports each adapted to be fixed to an associated one of said electrical conductors, a plurality of electrical leads having their opposite ends fixed to said spaced supports with each end being fixed to an associated support on a given diameter, and means engaging and rotating a central portion of each lead relative to both of its opposite ends to take up any slack therein caused by relative axial movement of said supports to keep said leads within the confines of a theoretical cylindrical boundary extending between said supports and having said given diameter.

7. An expansion joint as set forth in claim 6 in which each of said pair of electrical conductors has a circular outline with a diameter equal to said given diameter and each of said supports comprises a circular plate having an outside diameter also approximately equal to said given diameter.

8. An expansion joint for electrically connecting associated ends of a pair of electrical conductors comprising, a pair of spaced supports each adapted to be fixed to an associated one of said electrical conductors, a plurality of electrical leads having their opposite ends fixed to said spaced supports with each end being fixed to an associated support on a given diameter, and means rotating a central portion of said leads to take up any slack therein caused by relative movement of said supports to keep said leads within the confines of a theoretical cylindrical boundary extending between said supports and having said given diameter, said rotating means comprising a central circular disc having an outside diameter equal to said given diameter and having the central portions of said leads fixed to the outer periphery thereof at spaced intervals and a spring device acting between at least one support and said central disc, said spring device yieldingly rotating said central disc to thereby rotate the central portion of each lead to take up any slack therein while keeping said leads within said cylindrical boundary.

9. An expansion joint for electrically connecting associated ends of a pair of electrical conductors comprising, a pair of spaced supports each adapted to be fixed to an associated one of said electrical conductors, a plurality of electrical leads having their opposite ends fixed to said spaced supports with each end being fixed to an associated one of said electrical conductors, a plurality of electrical leads having their opposite ends fixed to said spaced supports with each end being fixed to an associated support on a given diameter, and means rotating a central portion of said leads to take up any slack therein caused by relative movement of said supports to keep said leads within the confines of a theoretical cylindrical boundary extending between said supports and having said given diameter, each of said supports having a circular peripheral outline and a diameter equal to said given diameter, with each end of said leads being fixed to an associated support about its peripheral outline to define said expansion joint having a roughly cylindrical configuration of constant diameter which corresponds to said theoretical cylindrical boundary, said rotating means comprising a central circular disc having an outside diameter equal to said given diameter and having the central portions of said leads fixed to the outer periphery thereof at spaced intervals and a spring device acting between at least one support and said central disc, said spring device yieldingly rotating said central disc to thereby rotate the central portion of each lead to take up any slack therein while maintaining said cylindrical configuration of said expansion joint substantially intact.

10. An expansion joint as set forth in claim 9 in which said rotating means further comprises a rod having one end portion fixed to one of said supports and its opposite end portion supported by the other support for sliding movement relative thereto, said central disc being rotatably supported by said rod and said spring device acting between said rod and central disc to rotate said disc and said central portion of each lead.

11. An expansion joint as set forth in claim 10 in which said rod comprises a right circular cylindrical rod and said central disc has a right circular cylindrical inside surface extending through the center thereof which defines an opening for receiving said rod, said cylindrical surface supporting and enabling free rotation of said central disc about said rod.

12. An expansion joint as set forth in claim 10 in which said spring device comprises a torsion spring and each of said electrical leads is comprised of a plurality of individual strands arranged in a bundle.

13. An electrical power transmission system comprising; an outer protective conduit; a plurality of elongated electrical conductors supported in electrically insulated relation within said conduit; and an expansion joint for electrically connecting associated ends of an adjacent pair of said elongated conductors supported within said conduit; said expansion joint comprising, a pair of spaced supports each fixed to an associated one of said electrical conductors, a plurality of electrical leads having their opposite ends fixed to said spaced supports with each end being fixed to an associated support on a given diameter, and means engaging and rotating a central portion of each lead relative to both of its opposite ends to take up any slack therein caused by relative axial movement of said supports to keep said leads within the confines of a theoretical cylindrical boundary extending between said supports and having said given diameter.

14. A system as set forth in claim 13 and further comprising a plurality of disclike electrical insulating spacers each fixed concentrically around an associated electrical conductor and each supporting an associated conductor within said conduit.

15. A system as set forth in claim 14 in which each of said spacers has a plurality of passages extending therethrough and said system further comprising an electrical insulating fluid contained within said conduit under pressure and filling the volume between each electrical conductor and expansion joint and said conduit, said electrical insulating fluid being free to flow through said passages to provide improved insulation and cooling along the full length of each electrical conductor and any associated expansion joint.

16. A system as set forth in claim 13 in which each of said pair of electrical conductors has a circular outline with a diameter equal to said given diameter and each of said supports comprises a circular plate having an outside diameter also approximately equal to said given diameter.

17. An electrical power transmission system comprising; an outer protective conduit; a plurality of elongated electrical conductors supported in electrically insulated relation within said conduit; and an expansion joint for electrically connecting associated ends of an adjacent pair of said elongated conductors supported within said conduit; said expansion joint comprising; a pair of spaced supports each fixed to an associated one of said electrical conductors, a plurality of electrical leads having their opposite ends fixed to said spaced supports with each end being fixed to an associated support on a given diameter, and means rotating a central portion of said leads to take up any slack therein caused by relative movement of said supports to keep said leads within the confines of a theoretical cylindrical boundary extending between said supports and having said given diameter, each of said supports having a circular peripheral outline and a diameter equal to said given diameter with each end of said leads being fixed to an associated support about its peripheral outline to define said expansion joint having a roughly cylindrical configuration of constant diameter which corresponds to said theoretical cylindrical boundary, said rotating means comprising a central circular disc having an outside diameter equal to said given diameter and having the central portions of said leads fixed to the outer periphery thereof at spaced intervals and a spring device acting between at least one support and said central disc, said spring device yieldingly rotating said central disc to thereby rotate the central portion of each lead to take up any slack therein while maintaining said cylindrical configuration of said expansion joint substantially intact.

18. A system as set forth in claim 17 in which said rotating means comprises a rod having one end portion fixed to one of said supports and its opposite end portion supported by the other support for sliding movement relative thereto, said central disc being rotatably supported by said rod and said spring device acting between said rod and central disc to rotate said disc and said central portion of each lead.

19. A system as set forth in claim 18 in which said rod comprises a right circular cylindrical rod and said central disc has a right circular cylindrical surface through the center thereof which defines an opening for receiving said rod, said cylindrical surface supporting and enabling free rotation of said central disc about said rod.

20. A system as set forth in claim 18 in which said spring device comprises a torsion spring and each of said electrical leads is comprised of a plurality of individual strands arranged in a bundle.